INVENTORS
MAURICE F. KEATHLEY
ARTEZ F. MAINERS

United States Patent Office 3,431,834
Patented Mar. 11, 1969

3,431,834
APPARATUS FOR COOKING
Maurice F. Keathley and Artez F. Mainers, Memphis, Tenn., assignors, by mesne assignments, to Kentucky Fried Chicken Corporation, Nashville, Tenn., a corporation of Kentucky
Continuation of application Ser. No. 554,894, June 2, 1966. This application Aug. 31, 1967, Ser. No. 664,891
U.S. Cl. 99—336    7 Claims
Int. Cl. A47j 27/84

ABSTRACT OF THE DISCLOSURE

An automatic pressure cooking apparatus having a cooking pot and a lid therefor carrying a food rack, a fluid motor for raising and lowering the lid and rack, actuating means for the fluid motor, and latch means automatically responsive to closing of the lid for latching the same.

---

This application is a continuation of our application Ser. No. 554,894 filed June 2, 1966, now abandoned.

This invention relates to an apparatus for cooking and particularly relates to cooking foods in a liquid cooking medium.

Heretofore, in the above-mentioned type of cooking, there has been the problem of having to watch the items being cooked to determine the right amount of cooking, and in many instances the food was either undercooked or overcooked. Also, it was difficult to obtain consistency in the cooking, and it required a great deal of time on the cook's part. In addition, there have been problems of the drainage of the cooked items and it was usually necessary to remove the items to a drainage area remote from the cooking vessel.

The present invention is directed towards overcoming the above-mentioned and other problems in apparatus of the heretofore-mentioned type.

Thus, one of the objects of the present invention is to provide cooking apparatus for cooking quantities of food such as chicken in a consistent manner and at the exact temperature for the exact time required.

A further object is to provide such apparatus which requires very little attention by the cook and which apparatus is substantially automatic.

A further object is to provide such apparatus which includes an upwardly opening vat for containing the cooking medium, a rack having a plurality of shelves for supporting the food to be cooked, and means for movably supporting the rack for movement between a raised position above the vat in which the rack is raised out of the vat for loading of the food and for the drainage of the food, and a lowered position in which the rack is disposed in the vat for the cooking of the food.

A further object is to provide such apparatus which includes a top for the vat upon which the above-mentioned rack is mounted, and a piston-cylinder assembly which raises and lowers the top to raise and lower the rack therewith between the above-mentioned raised and lowered positions.

A further object is to provide such apparatus which includes means responsive to the lowering of the top for latching the top in a closed position on the vat.

A further object is to provide such apparatus in which is provided heat control means for controlling the heat on the vat including means for lowering the heat.

A further object is to provide such apparatus in which is included vent means for venting the interior of the vat to the outside atmosphere and in which is included means responsive to lowering of said top for closing the vent means.

A further object is to provide such apparatus in which is included timing means operably connected to the actuating means for the top latching means, operably connected to the piston-cylinder assembly for the top, operably connected to the heat control means, and operably connected to the vent means, for respectively opening the vent means, for turning off the heating means, for unlatching the top, and for raising the top with the rack to the heretofore-mentioned raised position, at predetermined times.

A further object is generally to improve the design and construction of apparatus for cooking.

The means by which the foregoing and other objects of the present invention are accomplished and the manner of their accomplishment will be readily understood from the following specification upon reference to the accompanying drawings, in which.

Figure 1:
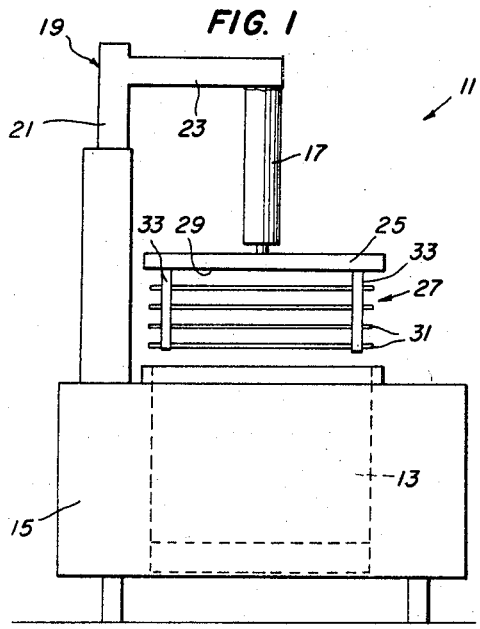
FIG. 1 is a side elevational view of the apparatus of the present invention with parts removed for purposes of illustration.

Referring now to the drawings in which the various parts are indicated by numerals, the apparatus 11 of the present invention includes an upwardly opening vat or vessel 13 for containing the cooking medium, such as the liquid shortening.

Vat 13 is supported by suitable means as the base 15. A piston-cylinder assembly 17 is supported in a vertical position over vat 13 by suitable means as the supporting structure 19, which includes a vertical member 21 fixedly supported from base 15 in upstanding relationship thereto and an arm 23 fixedly attached to vertical member 21 adjacent the upper end thereof and to which is fixedly attached the piston-cylinder assembly 17.

Figure 2:
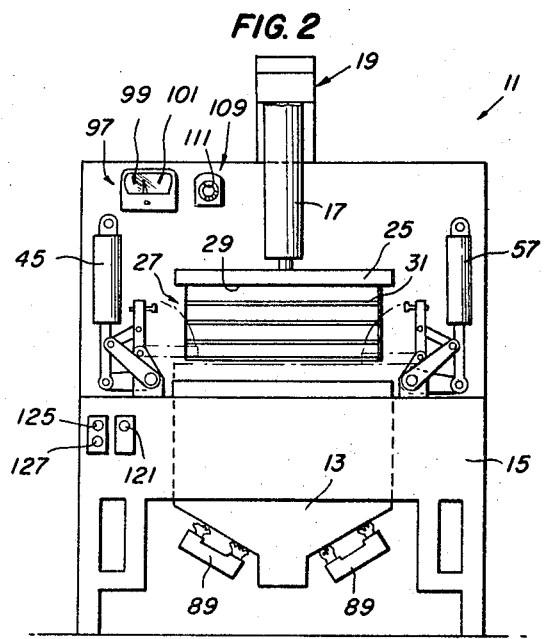
FIG. 2 is a front view thereof.
Figure 3:
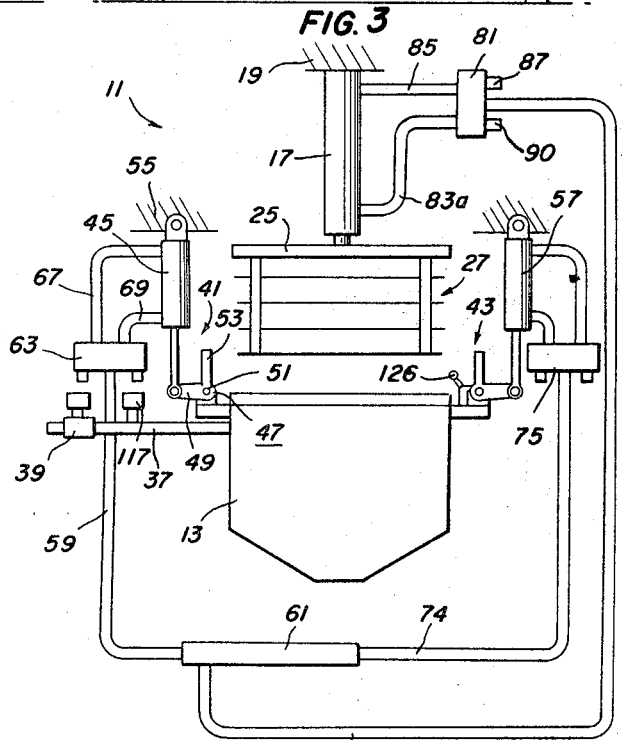
FIG. 3 is a diagrammatic showing of portions of the apparatus of the present invention.

A top 25 for vat 13 is horizontally disposed over vat 13 and supported by piston-cylinder assembly 17. A rack 27 is mounted on the bottom side 29 of top 25 and includes a plurality of shelves 31 that are vertically spaced and horizontally disposed beneath top 25. Shelves 31 are preferably removably mounted on the depending members 33 of the rack so that the shelves may be slid outwardly, if desired, for removing and placing the food on the shelves. During the loading, draining, and unloading of the food, top 25 and rack 27 are supported in a raised position by the piston-cylinder assembly 17, and as best seen in FIGS. 1–3, in which case the piston-cylinder assembly is in a retracted position. When the piston-cylinder assembly is actuated by means later to be described to extend the piston-cylinder assembly, top 25 and rack 27 are moved downwardly into a lowered position, best seen in FIG. 4, in which the rack is disposed in vat 13 for the cooking of the food and top 25 is in a closed position on vat 13 so that the interior chamber 35 of vat 13 is closed off from the outside atmosphere. A pipe 37 leads from chamber 35 and has interposed therein a normally open vent valve 39 which is closed when pressure is to be built up in chamber 35 and opened during certain conditions to vent the chamber 35 to the outside atmosphere, as will be understood better in the description to follow later. However, it should be pointed out here that vent valve 39 is a solenoid valve which is normally open when the apparatus 11 is in the open position shown in FIGS. 1–3.

Figure 4:
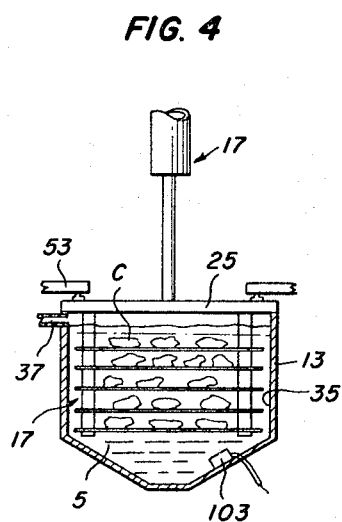
FIG. 4 is a fragmentary diagrammatic view taken as on a vertical plane of a portion of the apparatus of the present invention and shown in a cooking position.

Suitable clamping assemblies 41, 43 are provided on base 15 adjacent opposite sides of vat 13 to clamp the top 25 when it is moved into the heretofore-mentioned lowered position. Clamping assembly 41 comprises a piston-cylinder assembly 45 and a suitable clamp per se which is indicated diagrammatically as at 47. Thus, clamp 47 includes an arm 49 pivotally attached at the lower end of piston-cylinder assembly 45 and fixedly mounted on a shaft 51 which in turn is mounted by suitable means from base 15 for turn about a horizontal axis. A suitable clamping portion 53 is fixedly attached to shaft 51 and movable between an unclamped position out of the way of top 25, as shown in FIG. 3 (when piston-cylinder assembly 45 is extended), and a clamped position on top 25, as seen in FIG. 4 (when piston-cylinder assembly 45 is retracted). Piston-cylinder assembly 45 is preferably supported vertically from base 15 by suitable means not shown in FIG. 2, and shown schematically as at 55 in FIG. 3. Clamping assembly 43 is substantially identical to clamping assembly 41 in includes the piston-cylinder assembly 57 and other related parts similar to that heretofore-described relative to clamping assembly 41.

A pipe 59 leads from a source 61 of air under pressure to a solenoid-actuated valve 63 which is normally in a first position when the solenoid 65 thereof (see FIG. 5) is deenergized and is in a second position when the solenoid is energized. When valve 63 is in said first position as indicated by the solid line arrows in FIG. 5, the high-pressure air is directed into piston-cylinder assembly 45 through the pipe 67 to cause extension of the piston-cylinder assembly and movement of the clamping portion 53 into an unclamped position shown in FIG. 3. It will be understood that the air is exhausted from below the piston of the piston-cylinder assembly through pipe 69 and out vent 71, when the valve 63 is in said first position. When valve 63 is shifted into said second position, the reverse of the above-mentioned flow takes place, that is, the air is directed into the piston-cylinder assembly 45 through the pipe 69 and vented through pipe 67 and vent 73, as shown by the dashed line arrows in FIG. 5. In said second position, it will be understood that clamping portion 53 is in a clamped or locked position relative to top 25, as best seen in FIG. 4, and the piston-cylinder assembly 45 is retracted. The action of the high-pressure air relative to piston-cylinder assembly 57 is substantially the same as that heretofore-described relative to piston-cylinder assembly 45. A detailed description thereof is not deemed necessary other than to state that the pipe leading from the high pressure air is shown as at 74, which corresponds to pipe 59; the valve is indicated as at 75, which corresponds to valve 63; and the solenoid of valve 75 is shown as at 77, which corresponds to solenoid 65.

Figure 5:
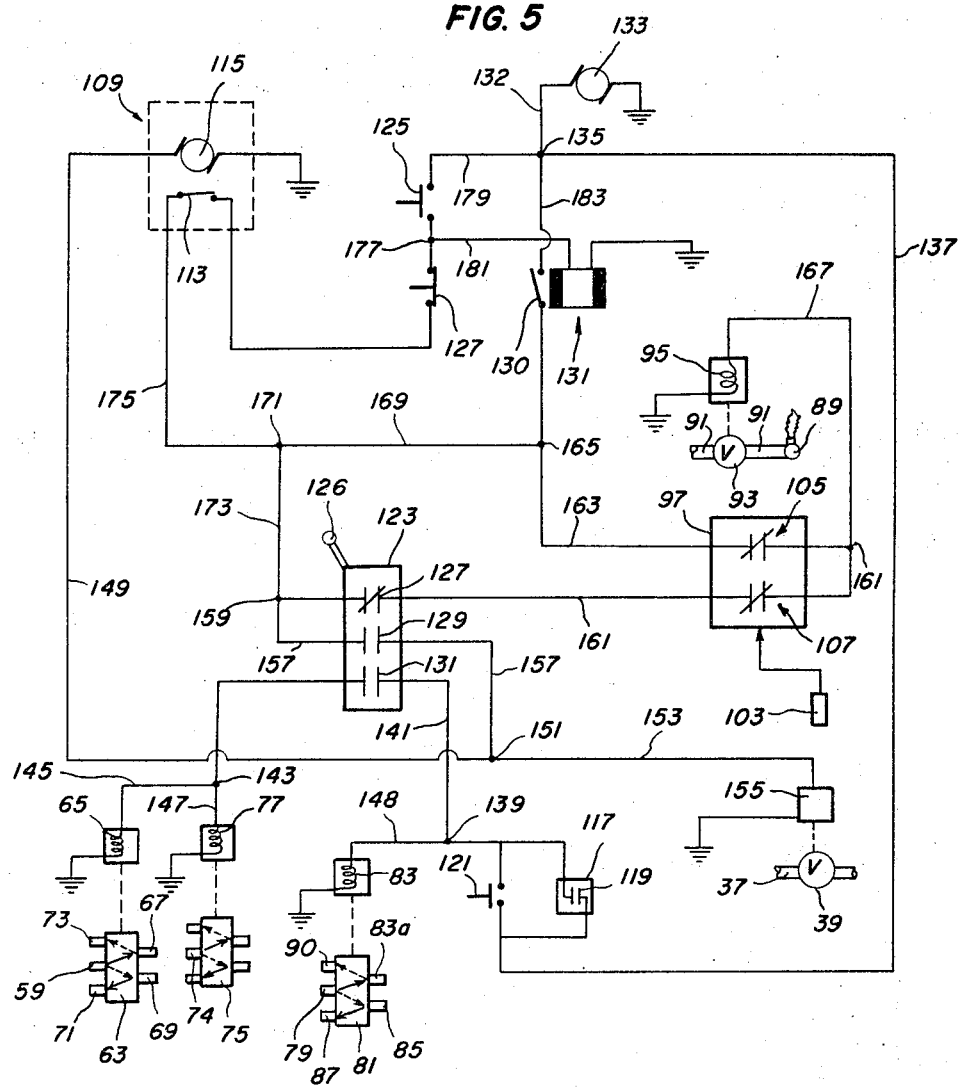
FIG. 5 is a schematic showing of the electrical system of the apparatus of the present invention.

A pipe 79 leads from high pressure air source 61 to a solenoid actuated valve 81 which is normally in a first position shown by the solid line arrows in FIG. 5 when the solenoid 83 of valve 81 is deenergized and is shiftable to a second position shown by the dashed line arrows in FIG. 5 when the solenoid is energized. When in said first position, valve 81 directs the high pressure air into the piston-cylinder assembly 17 through pipe 83a to cause retraction of the piston-cylinder assembly and to raise top 25 and rack 27 into the heretofore-mentioned raised position shown in FIGS. 1–3. It will be understood that the air in the top of piston-cylinder assembly 17 is directed through the pipe 85 to the outside atmosphere through the vent 87 when valve 81 is in said first position. When solenoid 83 is energized, substantially the reverse of the above-described operation takes place. Thus, the valve is shifted into said second position and the high pressure air is directed through pipe 85 to the piston-cylinder assembly 17 whereupon the piston-cylinder assembly is extended and top 25 with rack 27 is lowered into the position shown in FIG. 4. It will be understood that when valve 81 is in said second position, the air will be exhausted from piston-cylinder assembly 17 through pipe 83a and the vent 90.

Heating means is provided for heating vat 13 and the heating means preferably comprises gas burners 89 which are supplied through a pipe 91 (see FIG. 5) leading from a source of gas, not shown, and in which pipe is interposed a solenoid-actuated valve 93, which when the solenoid 95 thereof is deenergized is in a first position in which valve 93 is closed and is shiftable to a second position in which valve 93 is open to supply gas to the burners 89. Said heating means includes suitable well known temperature control means therefor which is indicated as at 97 and can be set manually for a low temperature indicated on the dial as at 99 and a high temperature indicated on the dial as at 101. In temperature control means 97 is included the usual heat responsive means 103 which is disposed in chamber 35 and which is effective to cause opening of the normally closed low temperature switch 105 in temperature control means 97 when the low temperature that has previously been set has been reached in chamber 35 and which causes the normally closed high temperature switch 107 to open when the previously set high temperature has been reached. A more detailed description of the functioning of temperature control 97 in connection with gas burners 89 will be described later.

An electrical timing device 109 of suitable construction is provided and includes the usual knob 111 upon which the desired time may be set and at the end of which time a normally closed switch 113 is momentarily opened and the device is reset for the next timing cycle. The electrical motor of the timing device 109 is shown as at 115.

A pressure responsive device 117 of usual construction is provided on pipe 37 and in communication with the interior thereof so that it is responsive to the pressure in chamber 35. The pressure responsive device 117 is of that well known type that can be set to a given pressure so that the normally open switch 119 therein will close upon a predetermined set pressure being reached and will open when the pressure falls below said predetermined amount. As for example, device 117 can be set so that when the pressure reaches two pounds, switch 119 will close and will open when it falls below that amount. A normally open pushbutton switch 121 is provided in parallel across switch 119. Switch 121 is preferably mounted on base 15 in a convenient place for the operator.

A limit switch 123 having an actuating lever 126 and three conjointly operated switches 127, 129, and 131, is mounted on base 15 in such a position that upon downward movement of top 25 and rack 27 the limit switch is actuated from a first position shown in FIG. 5 in which switch 127 is closed switch 129 is open, and switch 131 is open, to a second position in which switch 127 is open, switch 129 is closed, and switch 131 is closed. Then upon subsequent raising of top 25 with rack 27 the limit switch 123 returns to its normal or first position shown in FIG. 5.

Other switches provided are a normally open pushbutton start switch 125, a normally closed pushbutton stop switch 127, and a normally open switch 130 provided as part of a relay 131. Switches 125 and 127 are preferably mounted on base 15 in a convenient location for the operator, as for example, on the front of the base.

Referring now to the wiring diagram of the heretofore-mentioned electrical components, a lead 132 extends from a suitable source of electrical current indicated diagrammatically as at 133 to a juncture 135. A lead 137 extends from juncture 135 to juncture 139 and has switches 121 and 119 (which are themselves in parallel) interposed in the lead 137. A lead 141 extends from juncture 139 to juncture 143 and has switch 131 interposed therein. Leads 145 and 147 respectively extend from juncture 143 to the respective solenoids 65 and 77 thence to ground. A lead 148 extends from juncture 139 to solenoid 83 and thence to ground. A lead 149 extends from motor 115 to juncture 151. A lead 153 extends from juncture 151 to the solenoid 155 of valve 39 and thence to ground. A lead 157 extends from juncture 151 to juncture 159 and has interposed therein switch 129. A lead 161 extends from juncture 159 to juncture 161 and has interposed in series therewith switches 127 and 107. A lead 163 extends from juncture 161 to juncture 165 and has switch 105 interposed therein. A lead 167 extends from juncture 161 to solenoid 95 and thence to ground. A lead 169 extends from juncture 165 to juncture 171 and a lead 173 connects juncture 171 and juncture 159. A lead 175 extends from juncture 171 to juncture 177 and has interposed therein in series switches 113 and 127. A lead 179 extends from juncture 177 to juncture 135 and has interposed therein a switch 125. A lead 181 extends from juncture 177 to ground and has interposed therein the coil of relay 131. A lead 183 extends between junctures 135 and 165 and has interposed therein switch 130.

In describing the operation of the device 11 of the present invention, it is assumed that the device is initially in the position shown in FIGS. 1–3 and the switches, valves, etc., are in the positions shown in solid lines in FIG. 5. First, the cook or operator presses the start switch 125 which starts the operation of the burners 89 to heat the cooking medium S. This portion of the circuit is traced as follows: The electrical current from power source 133 flows through lead 132, lead 179 and switch 125, lead 175 and switches 127, 113, lead 169, lead 163 and switch 105, lead 167 and through solenoid coil 95 to ground. This causes valve 93 to open and the gas to flow to burners 89, which preferably have a pilot light, not shown, for the lighting thereof. It will be understood that power will still find its way to coil 95 after switch 125 has been released since the current when switch 125 was closed flowed through lead 181 and the coil of relay 131 which closed switch 130 to cause the current to flow through lead 183 to juncture 165, lead 163 and switch 105, and lead 167. When the heretofore, mentioned low temperature is reached, it will be understood that switch 105 will open but that the burners 89 will continue to operate since the current will find its way to solenoid 95 from juncture 165 through lead 169, lead 173, switch 127, lead 161 and switch 107, and lead 167. After the heretofore-mentioned high temperature has been reached, it will be understood that switch 107 will open but that this high temperature will substantially be maintained since switch 107 will again close when the temperature of the cooking medium S falls below the predetermined high temperature. Next, the operator loads shelves 31 with the food C to be cooked, as for example, the chicken. Then, the operator pushes the switch 121 and holds it in. This causes the top 25 with the rack 27 to move downwardly towards the heretofore-described lowered position. This portion of the circuit is traced as follows: The current from source 133 flows through lead 132, lead 137, and switch 121, lead 148, and solenoid 83 to ground, which moves valve 81 into the heretofore-mentioned second position causing the piston-cylinder assembly 17 to be extended. Just before top 25 reaches said lowered position, it strikes the lever 126 to move the limit switch 123 into its said second position whereupon the clamping assemblies 41, 43 will be moved into a clamping position relative to top 25. Also, movement of switch 123 into its said second position causes vent valve 39 to close so that pressure can be built up in chamber 35. This portion of the circuit is traced as follows: Current flows from source 133 through lead 132, lead 183 and switch 130, lead 169, lead 173, lead 157 and switch 129, lead 153, and solenoid 155 to ground. In addition, movement of limit switch 123 to its said second position causes the timing device 109 to begin timing. This portion of the circuit is traced as follows: From power source 133 current flows through lead 132, lead 183, and switch 130, lead 169, lead 173, lead 157 and switch 129, lead 149, and motor 115 to ground. Additionally, when limit switch 123 is moved into its said second position, switch 127 will be opened which will open the circuit through the high temperature portion of temperature control 97 to cause the temperature to drop to low temperature during the cooking of the food. Now that top 25 is closed and clamped and the vent valve is closed, the food being cooked builds up pressure in a short time and when the pressure builds up above the amount set on pressure switch 117, switch 119 closes to keep the heretofore-mentioned circuit set up to the vent valve, timing device, and piston-cylinder assemblies 17, 45 and 57, whereupon the operator can release the pushbutton switch 121.

After the predetermined set time has elapsed on timing device 109 and the food C is cooked, switch 113 will open which will cause the power to be cut off to relay 131 and the switch 130 to open. Opening of switch 130 causes the current to be cut off to solenoid 95 and thus the burners 89 to shut off. In addition, it will be seen from the circuit in FIG. 5 that current to solenoid 155 will be interrupted which will cause vent valve 39 to open and vent chamber 35 to allow the pressure to drop therein. It will be understood that top 25 will remain closed and the clamping assemblies 41, 43 will remain in a latched position during the dropping of the pressure until the pressure drops below the amount set on pressure responsive device 117 whereupon switch 119 will open and cause the current to be interrupted to solenoids 65, 77 and 83, whereupon the valves 63, 75, and 81 will be shifted into their respective said first positions to cause clamping assemblies 41, 43 to unlatch, and then top 25 with rack 27 to move to said raised position. It will be understood that by suitable well known means there is a slight delay in the actuation of piston-cylinder assembly 17 over that for piston-cylinder assemblies 45, 57 so that the top can be unlatched just before it begins to rise. Such delay means for example can be either by electrical means or by restricting the air flow to piston-cylinder assembly 17 and allowing a free flow to piston-cylinder assemlies 45, 57 for faster starting thereof. As soon as top 25 raises a slight amount, the switch 123 will be moved to its said first posiiton, whereupon the circuit will be set up again in the position shown in FIG. 5 by pushing button 125 for subsequent cycling by pushing button 121, after the rack 27 has remained in said raised position long enough to drain the cooking medium S from food C back into the vat 13, the food C removed, and another batch of food loaded onto the rack 27.

It will be understood that, if desired, apparatus 11 can be converted to a nonpressurized cooking apparatus, as for example, by leaving vent valve 39 open or by not having the top sealed relative to the vat, without departing from the spirit and scope of the present invention. Also, it will be understood that with a nonpressurized apparatus there would be no necessity of having the clamping assemblies 41, 43.

From the foregoing description, it will be understood that a vastly improved cooking apparatus is provided which can cook great quantities of food in a very efficient and fast manner, and with little attention on the part of the cook.

Although the invention has been described and illustrated with respect to a preferred embodiment thereof, it is to be understood that it is not to be so limited since changes and modifications may be made therein which are within the full intended scope of this invention as hereinafter claimed.

We claim:

1. Apparatus for cooking under pressure comprising an upwardly opening vat for containing the cooking medium, heating means operatively associated with said vat for heating the cooking medium, a top for said vat, a rack mounted on said top beneath said top and adapted to support the food to be cooked, a piston-cylinder assembly attached to said top for movably supporting said top and said rack for movement between a raised position above said vat in which said rack is outside of said vat for loading of the food thereon and for draining of the food, and a lowered position in which said rack is disposed in said vat for cooking of the food when said rack is in said lowered position, said top being in a closed position on said vat for the closing off of the interior of said vat from the outside atmosphere whereby the pressure in said vat can build up during cooking of the food, actuating means operably coupled to said piston-cylinder assembly including means for initiating movement of said rack towards said lowered position, and means responsive to lowering of said top for latching said top in a closed position on said vat.

2. The apparatus of claim 1 in which said rack includes a plurality of horizontally disposed and vertically spaced shelves beneath said top.

3. The apparatus of claim 1 in which is included heat control means for controlling the heat on said vat, and including means for lowering the heat on said vat.

4. The apparatus of claim 1 in which is included operable and closable vent means for venting the interior of said vat to the outside atmosphere and in which is included means responsive to lowering of said top for closing said vent means.

5. The apparatus of claim 4 in which is included timing means operably connected to said means for latching said top to said piston-cylinder assembly, to said heat control means, and to said vent means for opening said vent means, for turning off said heating means, for unlatching said top, and for raising said top and said rack to said raised position automatically at a predetermined time.

6. Apparatus for cooking under pressure comprising a cooking vessel and a lid therefor, rack means for supporting food in cooking position in said vessel, means for moving said lid between a closed cooking position on said vessel and a position clear of said vessel to provide access to said rack means, and latch means for said lid actuable responsive to movement of said lid upon said vessel to restrain movement of said lid away from said vessel when the lid is in a closed position on said vessel, said latch means being separate from said means for moving the lid to closed and clear positions relative to the vessel, and said latch means engaging an outer surface of said lid.

7. Cooking apparatus as described in claim 6 further including timing means for controlling the cooking period and lowering the pressure in said vessel at the end of said period, and means responsive to lowering of the vessel pressure to a safe value for releasing said latch means.

References Cited

UNITED STATES PATENTS

| | | |
|---|---|---|
| 1,394,612 | 10/1921 | Dernell. |
| 2,772,626 | 12/1956 | Shaw. |
| 2,915,000 | 12/1959 | Hetzel. |
| 3,026,790 | 3/1962 | Arvan. |
| 3,187,664 | 6/1965 | Jennings _____ 99—329 |
| 3,273,488 | 9/1966 | Anetsberger. |

ROBERT W. JENKINS, *Primary Examiner.*

U.S. Cl. X.R.

99—410, 411, 417